Oct. 22, 1929.  J. FIEUX  1,732,677
STABILIZING APPARATUS
Filed Feb. 16, 1926   7 Sheets-Sheet 1

Oct. 22, 1929.　　　J. FIEUX　　　1,732,677
STABILIZING APPARATUS
Filed Feb. 16, 1926　　　7 Sheets-Sheet 2

Oct. 22, 1929.   J. FIEUX   1,732,677
STABILIZING APPARATUS
Filed Feb. 16, 1926   7 Sheets-Sheet 3

Inventor
Jean Fieux
Mauro, Cameron, Lewis & Kirkam
Attorneys

Oct. 22, 1929.    J. FIEUX    1,732,677
STABILIZING APPARATUS
Filed Feb. 16, 1926    7 Sheets-Sheet 4

Oct. 22, 1929.   J. FIEUX   1,732,677
STABILIZING APPARATUS
Filed Feb. 16, 1926   7 Sheets-Sheet 5
Fig. 14.
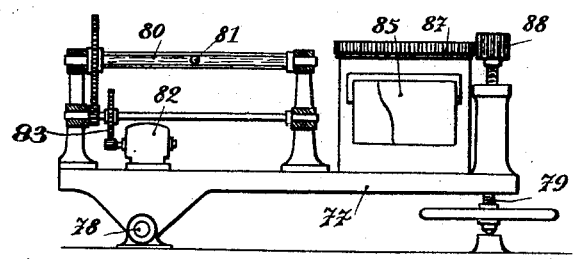
Fig. 17.
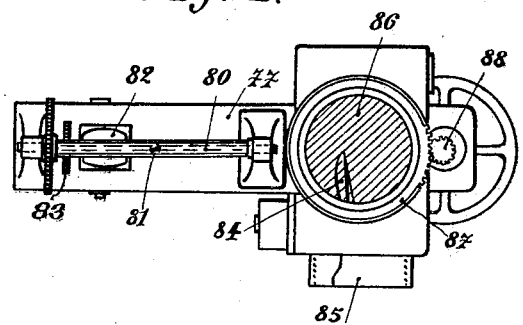
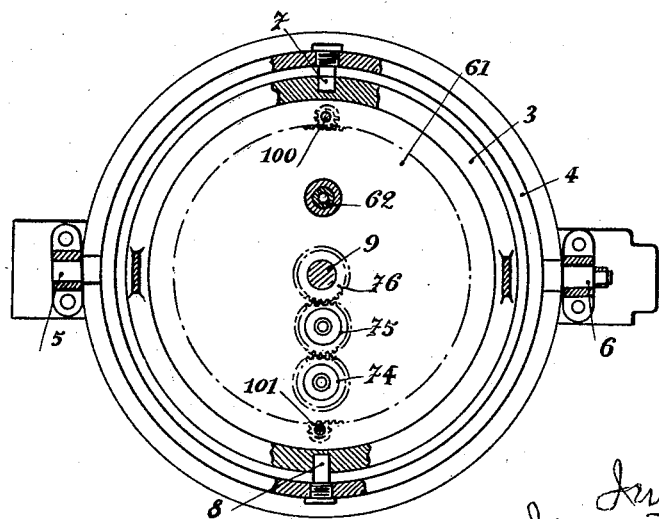
Fig. 9.
Inventor
Jean Fieux
By
Mauro, Cameron, Lewis & Massam
attorneys Oct. 22, 1929.    J. FIEUX    1,732,677
STABILIZING APPARATUS
Filed Feb. 16, 1926    7 Sheets-Sheet 6

Patented Oct. 22, 1929

1,732,677

UNITED STATES PATENT OFFICE

JEAN FIEUX, OF PARIS, FRANCE, ASSIGNOR OF ONE-HALF TO SCHNEIDER & CIE., A LIMITED JOINT STOCK COMPANY, OF PARIS, FRANCE

STABILIZING APPARATUS

Application filed February 16, 1926, Serial No. 88,636, and in France April 9, 1925.

This invention relates to an apparatus for maintaining a vertical and meridian of a place regardless of the movements of a vessel or, in aircraft, of the fuselage, relatively to the vertical and the meridian of the place.

In practice the invention comprises a system of conjugated reference tables or platforms, with devices for maintaining them in horizontal planes, while one of them is at the same time maintained in a fixed direction relatively to the points of the compass in spite of the movements made by the supporting vessel or aerial vehicle.

The invention, in short, has for its subject a device producing, for example on board vessels, what may be called "an artificial horizon fixed with regard to the points of the compass", that is to say a system of members forming a reference table or platform, suspended to the hull and maintained in practically unchangeable relationship with regard to the vertical and to the meridian of the place.

This device is adapted to constitute a position indicating mark the angular displacements of which, relatively to the hull, may for example, be reproduced on suitable receiving devices and in any part of the vessel. The indications thus collected may be utilized on the spot or at a distance, for example, for stabilizing platforms and supports for apparatus, for determining the amplitude and speed of the angular movements of the hull, for obtaining, when laying guns, the compensation or correction which must be made in order to allow for the varying inclination of the firing platforms, for firing these guns automatically, for applying the method of indirect firing on board vessels, etc.

The device comprises essentially a reference table or platform formed by a gyroscope of suitable mass called the "horizon stabilizer". The new device is primarily characterized by the feature that the forces produced by the mechanisms connected to the said gyroscope-table which at each moment tend to deflect it from its plane, are compensated for by assistants or gun servers observing for this purpose an auxiliary gyroscope of small mass, suspended from the gyroscope forming the reference or indicating table and substantially free from any disturbing influence. This gyroscope, which may be called the "horizon indicating gyroscope" reveals, on account of its connection with the gyroscope-table, the deflections of the latter so that the assistants or gun servers who observe the displacements of the gyroscope-table and the indicating or observation gyroscope relatively to each other, can act upon the first one in order to correct at any moment the observed deflections.

The installation comprises, conjugated with the horizon stabilizing gyroscope, a gyroscope of suitabe mass stabilizing for orientation relatively to the points of the compass, the deflections of which gyroscope are compensated for by assistants or gun servers observing a gyroscope indicating orientation relatively to the points of the compass, which gyroscope is mounted upon the same support as the orientation stabilizing gyroscope, the said support connected to the gyroscope-table being adapted, however, to be freely turned relatively to the latter.

If the invention is adapted for use on a ship; for example; the indications relating to the horizon are given at each moment by the relative displacements between the position indicating or reference table formed by the stabilizing gyroscope and the hull to which this gyroscope is suspended.

The indications relating to orientation with regard to the points of the compass are given by the displacements of the common support of the orientation stabilizing gyroscope and of its indicating gyroscope on the one hand, and the reference table (stabilized with regard to horizon) on the other hand, relatively to each other.

On account of the compensating couples applied by the observers the apparatus preserves practically this property of constituting a fixed mark whatever be the resistances it must overcome in order to produce the operation of the service devices, such as tachometers, angle-transmitters, firing apparatus, etc.

In practice and according to the invention, the two "indicating" gyroscopes are suspended, practically at their centre of gravity, from the frame which is stabilized as regards orientation. Each of them will be compensated for the effect of the diurnal movement, by an additional mass which imposes upon it a couple, of suitable value and orientation with regard to the points of the compass, in the field of gravity.

According to the invention also, the axis of the rotating mass of the gyroscope indicating orientation, after having been brought into a north-south direction, is kept practically horizontal by the adjustable torsion of the cable suspending the vertical frame of this gyroscope. Further, the axis of the rotating mass of the orientation stabilizing gyroscope may be brought back towards its mean position by the application of a force tending to turn the frame set with regard to the points of the compass, around its vertical suspension axis.

Finally the axis of the rotating mass of the horizon indicating gyroscope is kept in a position very nearly vertical by the action of electro-magnets which are energized according to the indications given by levels of special construction, controlling the inclination of the reference table both in the longitudinal and transverse directions of the vessel. These levels, as described hereinafter, are constructed so as to be practically unaffected by the alternating accelerations of very small period, such as the accelerations due to the rolling of the ship, as well as the inertia effects due to the turning and to the variations in speed of the ship.

A practical form of construction of the invention is shown in the accompanying drawings, in which:—

Figure 9 is a plan section taken along the line 9—9 in Figure 1 showing the method of suspension of the arrangement.

Figures 14 and 17 show in elevation and plan respectively, views of the level serving for adjustment in the longitudinal direction of the vessel.

Figure 1:
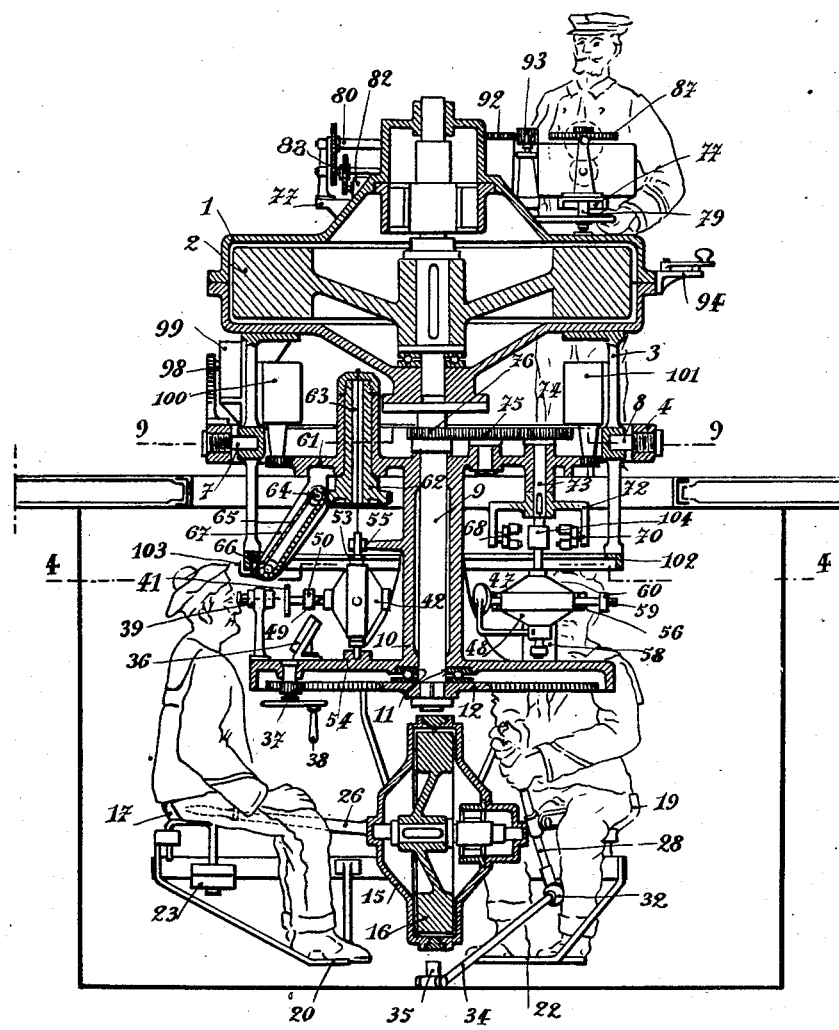
Figure 1 shows the arrangement of the device in sectional elevation taken along the line 1—1 in Figure 3, the casings of the gyroscopes serving as reference marks being shown in outside view.

The casing 1 forming a reference table or platform contains a gyroscopic mass 2 having a vertical axis which is rotated in the known manner by an electric motor. This casing is suspended in the hull of the vessel by means of the support 3 to which it is integrally secured and the frame 4 which is pivotally mounted on the one hand upon the hull by means of the trunnions 5 and 6, and on the other hand upon the support 3 by means of the trunnions 7 and 8.

The casing 1 is provided at its lower part and in alignment with the axis of the rotating mass 2 with a vertical post 9 about which turns the frame 10 of the arrangement which is oriented relatively to the points of the compass and is suspended from the previous arrangement by means of the thrust ball-bearing 11 and the gear 12 keyed upon the said post.

The frame 10 carries at its lower part, by means of the trunnions 13 and 14, the frame or casing 15 of the orientation stabilizing gyroscope the mass 16 of which is rotated through the medium of an electric motor about an axis perpendicular to the line of these trunnions and practically horizontal in its mean position. It is provided, also at its lower part, with seats 17, 18 and 19 and footrests 20, 21 and 22 for the assistants or gun servers, as well as additional weights 23, 24 and 25 enabling the weights of these observers, whose duty it is to perform the compensating operations, to be balanced.

These observers exert their actions, one by means of the lever 26 mounted upon the casing 15 and the two others by means of levers 27 and 28 pivotally mounted upon forked members or straps 29 and 30 secured to the frame 10. The levers 27 and 28 are also pivotally connected, by means of ball and socket joints 31 and 32, to the links 33 and 34 mounted by means of turning and oscillating joints upon the same pivot 35 integrally secured to the hull.

Figure 7:
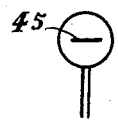
Figure 7 shows the form of the reference or datum marks provided upon the horizon indicating gyroscope.
Figure 8:
Figure 8 shows the form of the reference or datum mark provided upon the orientation indicating gyroscope.
Figure 4:
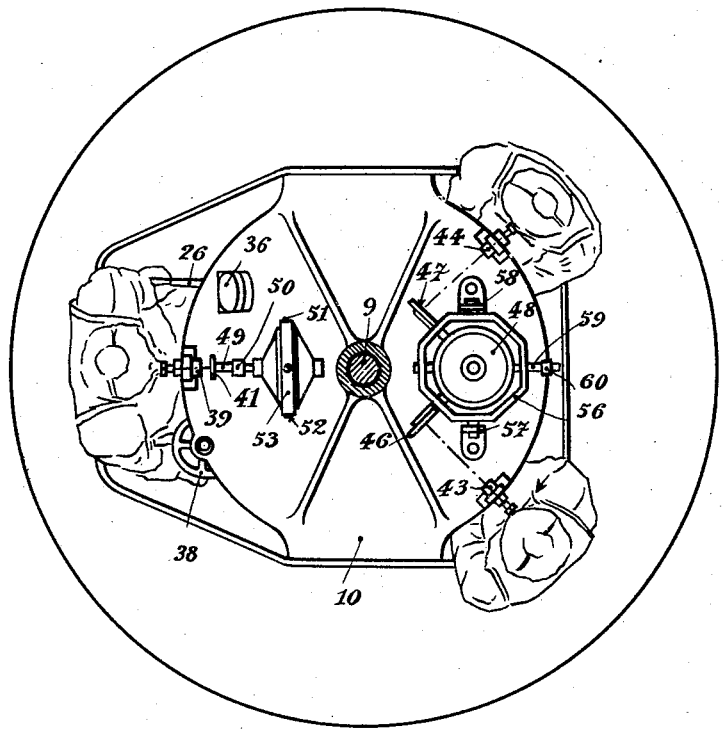
Figure 4 is a sectional elevation taken along the line 4—4 in Figure 1 and shows a plan view of the reference or indicating gyroscopes.
Figure 5:
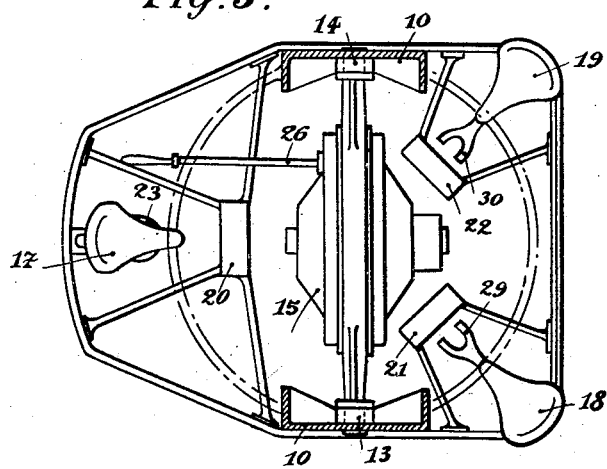
Figure 5 is a section taken along the line 5—5 in Figure 2 with a plan view of the orientation stabilizing gyroscope.

The central part of the frame 10 forms a table conjugated as described above with the table 1 and upon this table are mounted a head indicator 36, the shaft of the pinion 37 engaging with the gear 12 and actuated by the hand wheel 38, the telescope 39 for sighting upon the mark 40 (Fig. 8) on the graduated disk 41 provided upon the casing 42 of the orientation indicating gyroscope, as well as the telescopes 43 and 44 enabling sights to be taken upon the datum marks 45 (Fig. 7) provided upon the graduated disks 46 and 47 provided upon the casing 48 of the horizon indicating gyroscope.

Figure 2:
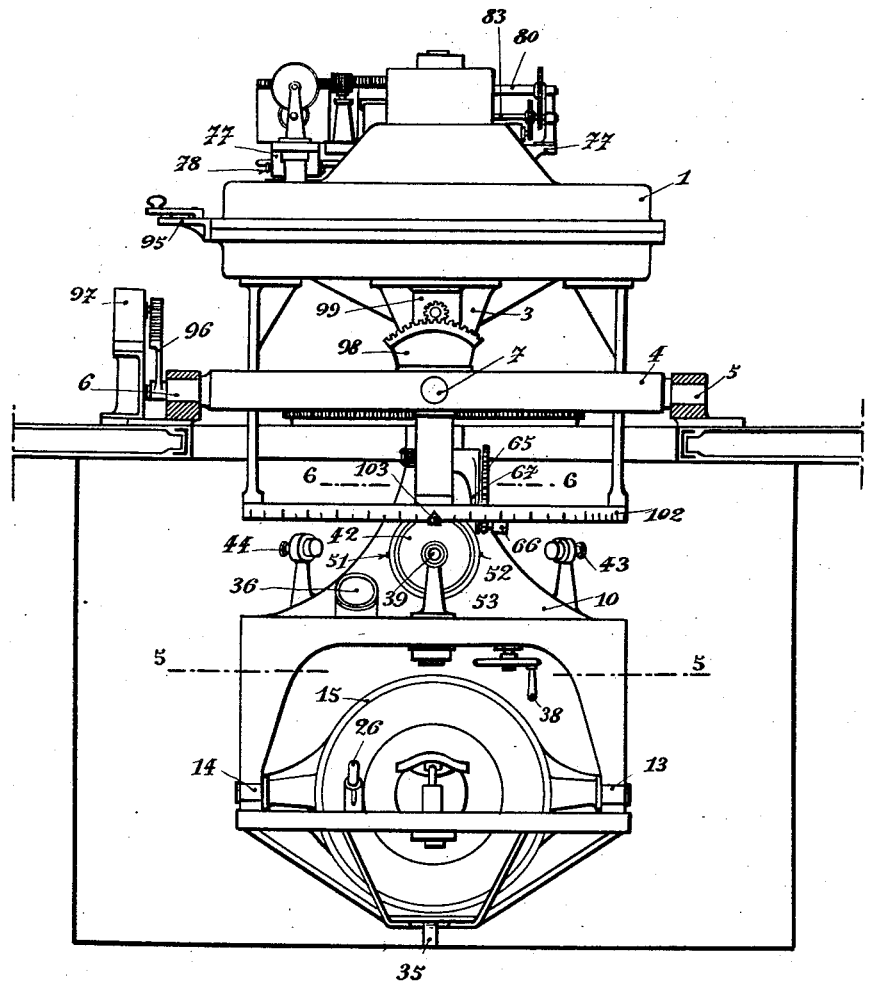
Figure 2 is an outside view of the side on which is placed the orientation indicating gyroscope.
Figure 3:
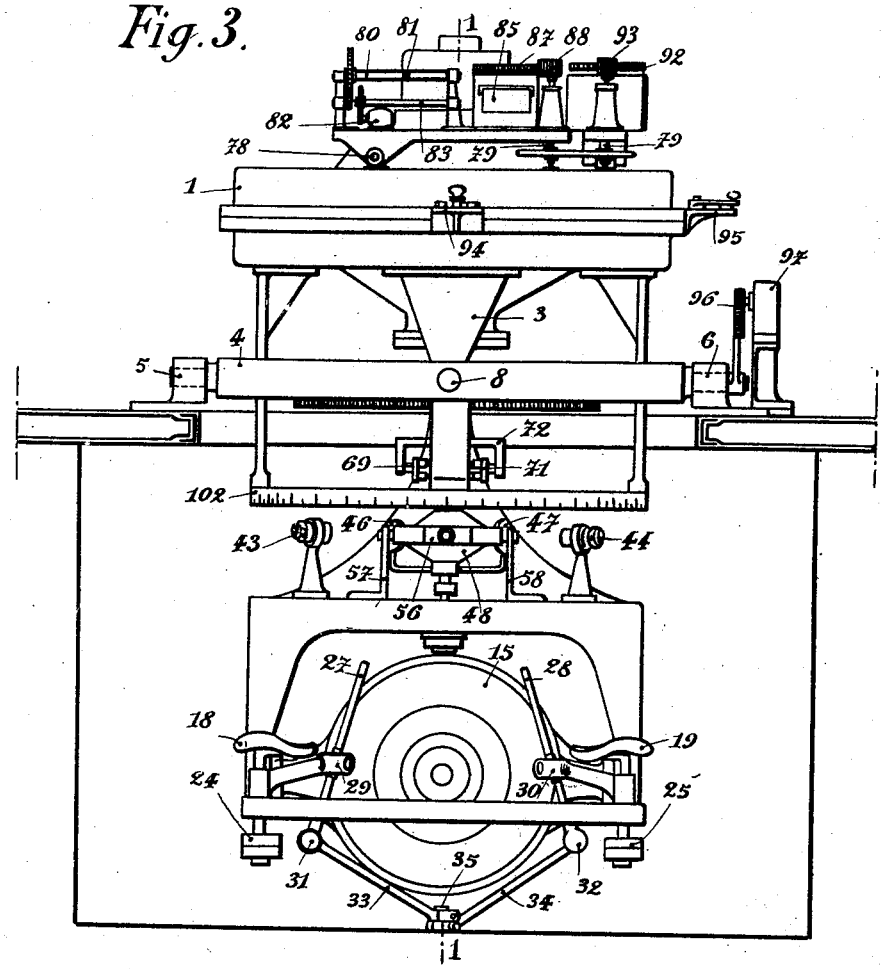
Figure 3 is an outside view of the side on which is placed the horizon indicating gyroscope.

The casing 42 contains a gyroscopic mass the movement of rotation of which is maintained electrically about a horizontal axis placed approximately in the direction of the rod 49 which supports the graduated disks 41 and the sliding weight 50 serving for compensating for the effect of the diurnal movement upon the orientation indicating gyroscope. It is pivotally mounted along a horizontal axis on trunnions 51 and 52 (Fig. 2) in the vertical frame 53 which is itself adapted to turn about a vertical axis in guides 54 and 55 secured to the frame 10.

The casing 48 contains a gyroscopic mass which is maintained electrically in rotation about a vertical axis. It is suspended from the frame 10 by a Cardan arrangement comprising the horizontal frame 56. The line about which this frame turns in the supports 57 and 58 secured to the frame is practically parallel to the line about which the casing 42 turns in the frame 53. A rod 59 placed in alignment with the axis of rotation about which the casing 48 turns in the frame 56 carries the sliding weight 60 serving for compensating for the effect of the diurnal movement upon the horizon indicating gyroscope.

The frame 10 is provided at its upper part with a circular toothed plate 61 as well as devices for rectifying the indicating or verifying gyroscopes.

Figure 6:
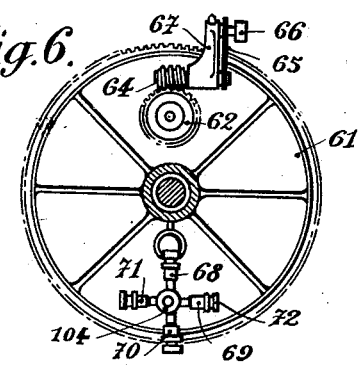
Figure 6 is a section taken along the line 6—6 in Figure 2 with a view seen from underneath of the compensating devices for the indicating gyroscopes.

A cylindrical sleeve 62 provided on this plate is adapted to turn about a vertical axis situated in alignment with the axis of rotation about which the frame 53 turns in its guides. The friction of the pivot 54 is practically annulled by applying a sufficient tension upon the cable 63 connecting the centre of the trunnion 55 to the centre of the cover of the sleeve 62. A certain amount of torsion may be given to this cable in either direction by the observer at the graduated disk 41 by means of the worm 64 (Figs. 1 and 6) which is actuated by means of the chain 65 and the milled nut 66, the common support 67 of these three last mentioned members being integral with the plate 61.

About the soft iron cylinder 104 mounted at the upper part of the casing 48 are adapted to turn the electromagnets 68, 69, 70 and 71 (Fig. 6) attached to the branches of the support 72 secured to the shaft 73 which passes through the plate 61 following a line which is practically in alignment with the axis of the horizon indicating gyroscope. The support 72 preserves a fixed orientation relatively to the hull on account of the engagement of the wheel 74 secured to the shaft 73 with the intermediate wheel 75 the shaft of which turns freely in the plate 61, which wheel 75 is itself driven by the wheel 76 secured to the post 9, the wheels 74 and 76 comprising the same number of teeth.

The casing 1 carries two slope indicators one arranged in the longitudinal direction of the vessel and the other in a direction transverse to the latter.

These longitudinal and transverse slope indicators each comprise: a pedestal 77 pivotally mounted upon the casing 1 by means of the hinge 78, a screw 79 passing through the pedestal in a vertical direction and forming a foot, a closed glass tube 80 containing a liquid and a ball 81, an electrical motor 82 communicating a movement of continuous rotation to the tube by means of the reduction gearing 83, whereby said ball 81 has rolling contact with tube 80.

The longitudinal slope indicator (Figs. 14 and 17, 13 and 11) is completed by a device recording the speed of the vessel given by a log. A stylo needle 84 traces the curve of this speed upon a band of transparent paper 85 which unwinds beneath the circular glass plate 86 at a practically constant speed obtained by means of a clock mechanism. The glass plate 86 is provided with a set of straight parallel lines; it may be placed in any direction for which purpose its toothed mounting 87 engages with the pinion 88 keyed upon the actuating screw 79.

Figure 15:
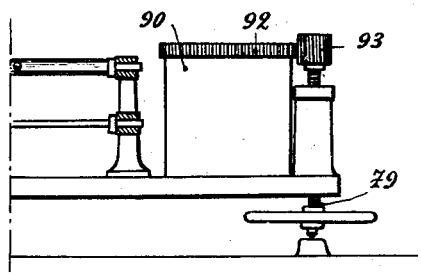
Figures 15 and 16 show a view in elevation and a view in plan respectively of the arrangement for correcting the level serving for adjustment in the transverse direction of the vessel.
Figure 16:
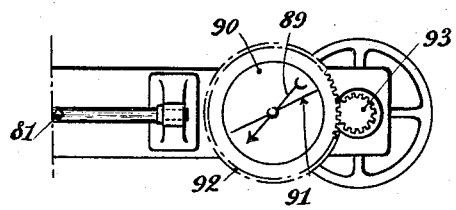
Figure 10:
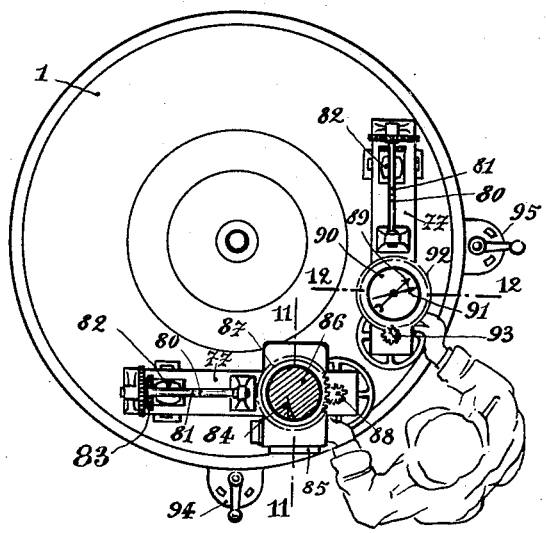
Figure 10 is a view seen from above of the horizon stabilizing gyroscope and of the controlling levels.
Figure 13:
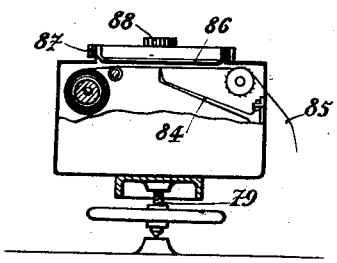
Figures 11 and 13 show views of the arrangement for correcting the above mentioned level a part being shown in section to a larger scale in Figure 11, the section being taken along the line 11—11 in Figure 10, and Figure 13 showing a sectional elevation of the arrangement.
Figure 11:
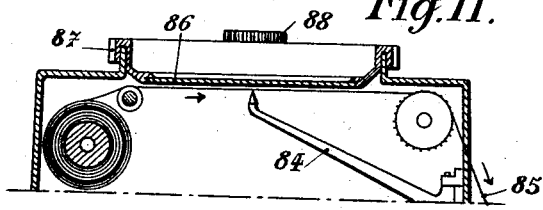
Figure 12:
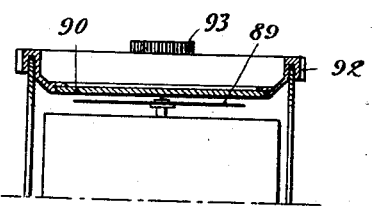
Figure 12 is a view of a part of the last mentioned arrangement shown partly in section along the line 12—12 in Figure 10.

The transverse slope indicator (Figs. 12, 15 and 16) is completed by an apparatus formed like a wattmeter, into one of the windings of which flows a current the strength of which is proportional to the speed of travel, a current the strength of which is proportional to the angular speed of turning of the vessel flowing into the other winding.

The needle or pointer, 89 of this apparatus is observed through a circular glass plate 90 provided with a diametral reference line 91. The latter may be made to occupy any direction relatively to the points of compass, the toothed mounting 92 of the glass plate engaging for this purpose with the pinion 93 keyed upon the actuating screw 79.

Current distributors 94 and 95 carried by the casing 1 and operated by the observer watching the slope indicators enable the electromagnets 68, 69, 70 and 71 to be supplied.

The frame 4 is adapted to carry for example a toothed sector 96 adapted to actuate a distant indication or distant control transmission system 97 secured to the hull, and another toothed sector 98 actuating a distant indication or distant control transmission system 99 provided upon the support 3. The latter may also carry a tachometer 100 and a distant indication or distant control transmission apparatus 101 actuated by the circular toothed band of the plate 61.

Finally a graduated ring 102, secured to the support 3 and a pointer 103 attached to the support 67 enable the orientation of the frame 10 relatively to the hull to be controlled.

The centre of gravity of the whole of the apparatus described above must be situated at a very small distance from and preferably beneath the point of intersection of the two axes about which the frame 4 turns.

The working of this apparatus necessitates the co-operation of several operators each having a definite duty to perform.

An observer whose duty is to effect the compensation for orientation relatively to the points of compass occupies the seat 17. He first turns the frame 10 by restraining the lever 26 against vertical movement and actuating the hand wheel 38 in order to bring the line of sight in a north and south direction to which he must keep very closely. He makes use for this purpose of the indication given by the head indicator device 36 and the control given by the pointer 103. By means of the telescope 39 he takes a sight on the datum mark 40 in the form of a cross upon the graduated disk 41. He brings the image of the vertical line of this datum mark into coincidence with the vertical wire of the telescope by exerting upon the lever 26 pressures or pulls in a vertical direction.

He also seeks to superpose the image of the horizontal line of the datum mark upon the horizontal wire of the telescope by suitably rotating the milled nut 66. If as a result of the natural precessions the lever 26 takes up an inconvenient position on account of the fact that it is too far from its mean position, the observer produces a correcting or compensating precession by suitable actuations of the hand wheel 38.

Two operators whose duty is to compensate with regard to horizon occupy the seats 18 and 19 and sight through the telescopes 43 and 44 upon the horizontal datum marks 45 provided upon the graduated disks 46 and 47. They make the images of these datum marks coincide with the horizontal wires of the telescopes by actuating, by suitable impulses, the levers 27 and 28.

A fourth operator is charged with the duty of rectifying the horizon indicating gyroscope and compensating the control levels, by manipulating the current distributors 94 and 95 and the hand wheels of the screws 79. He causes one or the other of the electromagnets 68 and 70 to be energized when he observes a slope in a longitudinal direction and one or the other of the electromagnets 69 and 71 when a slope in the direction transverse to the ship is indicated.

He sets on the one hand the set of parallel straight lines upon the glass plate 86 into a direction tangential to the last part of the curve traced upon the band 85 and on the other hand moves the reference mark 91 upon the glass plate 90 into the direction of the needle 89.

It is to be noted that one of the currents supplying the apparatus with a double winding may be provided by an electrical tachometer, such as 100, measuring the speed of turning of the hull about the vertical and consequently the angular speed of turning of the vessel, the other current having if desired the same source of supply as the current supplying the apparatus registering the speed in the direction of travel.

The base correction of the transverse slope indicator is thus proportional to the product $\omega V$, that is to say to the centrifugal force due to the turning of the vessel, which force is not periodic and is applied to the mass, in the same way as gravity, and is capable of falsifying the indication of the vertical in a plan perpendicular to the direction of travel.

On the other hand the base correction of the longitudinal slope indicator is found to be proportional to the inclination of the tangent to the curve obtained by plotting speed of travel against time, that is to say to the acceleration in the travelling speed, which forms the only force acting upon the mass, in the same way as the force of gravity, and capable of falsifying the indication of the vertical in a plane parallel to the direction of travel.

It is therefore sufficient to give to the correcting or compensating apparatus described above suitable constants in order to obtain the desired compensation for the effects of inertia upon the slope indicators.

As the rectification or readjustment of the horizon indicating gyroscope must be produced very slowly the base correction of the slope indicators may be made with a certain lag and consequently necessitate on the part of the fourth operator neither too careful observations nor too rapid movements.

Having now particularly described and ascertained the nature of my said invention and in what manner the same is to be performed, I declare that what I claim is:—

1. Apparatus of the class described comprising the combination of a table gyroscopically stabilized in a horizontal plane, a table carried by said first-named table and gyroscopically stabilized in azimuth, and manually operable means for compensating said tables for observed deflections thereof.

2. Apparatus of the class described comprising in combination a table, gyroscopic stabilizing means for maintaining said table in a horizontal plane, a table carried by said first-named table and movable in azimuth relative thereto, gyroscopic stabilizing means for maintaining said second-named table in predetermined orientation in azimuth, and manually operable means for applying couples to each of said stabilizing gyroscopic means to compensate for deflections of said tables.

3. Apparatus of the class described comprising in combination a table gyroscopically stabilized in a horizontal plane, a table carried by said first-named table and gyroscopically stabilized in azimuth, deflection indicating means for said tables, and means for applying compensating couples to said tables in accordance with the observed deflections.

4. Apparatus of the class described comprising in combination a support, a table universally mounted thereon and gyroscopically stabilized in a horizontal plane, a table carried by said first-named table and gyroscopically stabilized in azimuth, manually operable means for compensating said tables for observed deflections thereof, and means for indicating relative displacements of said first-named table and said support.

5. Apparatus of the class described comprising a support, a table universally mounted thereon and stabilized in a horizontal plane, a second table carried by said first table and gyroscopically stabilized in azimuth, means indicating deflections of said tables, means for compensating said tables for observed deflections, and means for transmitting relative displacements of said first-named table and support to a distance.

6. Apparatus of the class described comprising a table gyroscopically stabilized in a horizontal plane, a table mounted on said first-named table and gyroscopically stabilized in azimuth, gyroscopic means for indicating deflections of said tables, and means for compensating said tables for observed deflections.

7. Apparatus of the class described comprising a table gyroscopically stabilized in a horizontal plane, a table carried by said first-named table and gyroscopically stabilized in azimuth, gyroscopic deflection-indicating means, means whereby the indicated deflections may be observed, and means for compensating said tables for indicated deflections.

8. Apparatus of the class described comprising two tables, gyroscopic means for stabilizing one of said tables in a horizontal plane and the other in azimuth, gyroscopic means mounted on one of said tables for indicating both vertical and azimuthal deflections of said tables, and means for applying couples to said gyroscopic stabilizing means to compensate for observed deflections.

9. Apparatus of the class described comprising a table mounted for universal movement, a stabilizing gyroscope carried thereby having a vertical axis, a second table mounted on said first table for rotation in azimuth, a gyroscope carried by said second table and having a horizontal axis, a pair of deflection-indicating gyroscopes carried by said second table and having respectively vertical and horizontal axes, and means for compensating said tables for vertical and azimuthal deflections thereof.

10. Apparatus of the class described comprising a table mounted for universal movement, a gyroscope for stabilizing said table in a horizontal plane, a second table conjugated with said first table and movable in azimuth relatively thereto, a gyroscope for stabilizing said second table in azimuth, a pair of deflection-indicating gyroscopes mounted on said second table and having respectively vertical and horizontal axes, means for maintaining said axes in vertical and horizontal positions regardless of deflections of said tables, and means for compensating said tables for deflections thereof.

11. In apparatus of the class described, a table stabilized in a horizontal plane and in azimuth, a pair of gyroscopes mounted on said table, one having a vertical axis and the other a horizontal axis, reference marks on said gyroscopes, the displacement of said marks indicating deflections of said table, and means including levers operatively connected to said table for compensating for observed deflections thereof.

12. In apparatus of the class described, a table stabilized in a horizontal plane and in azimuth, a pair of gyroscopes mounted on said table, one having a vertical axis and one a horizontal axis, means for maintaining said axes in approximately constant positions regardless of deflections of said table, reference marks on said gyroscopes, telescopic means whereby said marks may be observed, and means for compensating said table for observed deflections thereof.

13. In apparatus of the class described, a table stabilized in a horizontal plane and in azimuth, a gyroscope universally mounted thereon having a horizontal axis of rotation, a reference mark on said gyroscope, an eyepiece whereby said mark may be observed, means for applying a couple tending to rotate said gyroscope about a vertical axis in either direction, and means for rotating said table in accordance with the indications of said reference mark.

14. In apparatus of the class described, a table stabilized in a horizontal plane and in azimuth, a gyroscope universally mounted thereon and having a horizontal axis of rotation, a reference mark on said gyroscope, an eyepiece whereby said mark may be observed, a vertical wire attached to said gyroscope, and means for torsioning said wire.

15. In apparatus of the class described, a table stabilized in a horizontal plane and in azimuth, a gyroscope universally mounted thereon and having a vertical axis of rotation, a reference mark on said gyroscope, an eyepiece whereby said mark may be observed, means for tilting said vertical axis, and means for tilting said table in accordance with indications of said reference mark.

16. In apparatus of the class described, a table stabilized in a horizontal plane and in azimuth, a gyroscope universally mounted thereon and having a vertical axis of rotation, a pair of reference marks on said gyroscope, a pair of eyepieces at right angles whereby said marks may be observed, and electromagnetic means for tilting said axis of rotation whereby said gyroscope is maintained in a horizontal plane.

17. In apparatus of the class described, a table stabilized in a horizontal plane and in azimuth, a gyroscope universally mounted thereon and having a vertical rotating shaft, reference marks on said gyroscope, eyepieces whereby said marks may be observed, and means for maintaining said gyroscope in a horizontal plane comprising a plurality of electro-magnets disposed about said shaft and adapted to tilt said shaft in the desired direction.

18. Apparatus of the class described comprising a table mounted for universal movement, a gyroscope for stabilizing said table in a horizontal plane, a second table conjugated with said first table and movable in azimuth relatively thereto, a gyroscope for stabilizing said second table in azimuth, an orientation-indicating gyroscope universally mounted on said second table and rotating about a horizontal axis, means for maintaining said axis in a horizontal plane, a horizon indicating gyroscope universally mounted on said second table and rotating about a vertical axis, means for maintaining said last-named axis vertical, means whereby deflections of said orientation-indicating and horizon-indicating gyroscopes relative to said second table may be observed, and means for compensating said conjugated tables for said observed deflections.

19. Apparatus of the class described comprising a support, a table universally mounted thereon, a gyroscope for stabilizing said table in a horizontal plane, a second table conjugated with said first table and movable in azimuth relatively thereto, a gyroscope for stabilizing said second table in azimuth, an orientation-indicating gyroscope universally mounted on said second table and rotating about a horizontal axis, means for maintaining said axis in a horizontal plane, a horizon indicating gyroscope universally mounted on said second table and rotating about a vertical axis, means for maintaining said last-named axis vertical, means whereby deflections of said orientation-indicating and horizon-indicating gyroscopes relative to said second table may be observed, means for compensating said conjugated tables for said observed deflections, and means interposed between said first table and support for transmitting relative displacements to a distance.

20. In apparatus of the class described, a table stabilized in a horizontal plane, a second table carried by said first table and stabilized in azimuth, a gyroscope mounted on said second table having horizontal reference marks, means for precessing said gyroscope to maintain it in a horizontal plane, and means indicating the direction of precession to be given to said gyroscope including a slope-indicator mounted on said first table.

21. In apparatus of the class described, a table stabilized in a horizontal plane, a second table carried by said first table and stabilized in azimuth, a gyroscope mounted on said second table having horizontal reference marks, means for precessing said gyroscope to maintain it in a horizontal plane, and means indicating the direction of precession to be given to said gyroscope including a pair of slope-indicators mounted on said first table at right angles to one another.

22. In apparatus of the class described, a table stabilized in a horizontal plane, a second table carried by said first table and stabilized in azimuth, a gyroscope mounted on said second table having horizontal reference marks, means for precessing said gyroscope to maintain it in a horizontal plane, and means indicating the direction of precession to be given to said gyroscope including a pair of slope-indicators mounted on said first table, one of said indicators indicating transverse deflections of said table proportional to the centrifugal force of turning of the vessel, and the other of said indicators indicating longitudinal deflections of said table proportional to the acceleration in speed of travel of the vessel.

23. In apparatus of the class described, a table stabilized in a horizontal plane, a second table carried by said first table and stabilized in azimuth, a gyroscope mounted on said second table having horizontal reference marks, means for precessing said gyroscope to maintain it in a horizontal plane, means indicating the direction of precession to be given to said gyroscope including a slope-indicator, means interposed between said first and second tables for transmitting a current proportional to the relative angular velocity to said indicator, and means for transmitting a current proportional to the linear speed of the vessel to said indicator.

24. In apparatus of the class described, a table stabilized in a horizontal plane, a second table carried by said first table and stabilized in azimuth, a gyroscope mounted on said second table having horizontal reference marks, means for precessing said gyroscope to maintain it in a horizontal plane, means indicating the direction of precession to be given to said gyroscope including a slope-indicator, means for transmitting a current proportional to the velocity of the vessel to said indicator, and means for correcting said indicator proportionally to the acceleration in said velocity.

25. In apparatus of the class described, the combination with a gyroscope mounted for universal movement and normally rotating in a horizontal plane and a gyroscope carried by said first-named gyroscope and normally rotating in a vertical plane, of compensating means external to said apparatus and operatively connected therewith to compensate said gyroscopes in accordance with observed deflections from said planes.

26. In apparatus of the class described, the combination with an apparatus mounted for universal movement and comprising a pair of gyroscopes, one normally rotating in a horizontal plane and the other in a vertical plane, of compensating means external to said apparatus and operatively connected therewith to compensate said gyroscopes in accordance with observed deflections from said planes, and means indicating the relative displacements of said gyroscopes from the horizontal and in azimuth.

27. In apparatus of the class described, the combination with an apparatus mounted for universal movement and comprising a pair of gyroscopes, one normally rotating in a horizontal plane and the other in a vertical plane, of compensating means external to said apparatus and operatively connected therewith to compensate the same in accordance with observed deflections of said gyroscopes from said planes.

28. In apparatus of the class described, the combination with an apparatus mounted for movement and comprising gyroscopic stabilizing means, of indicating means marking deviations of said apparatus from normal stabilized position and compensating means external to said apparatus and operatively connected therewith to compensate said apparatus in accordance with indicated deviations thereof.

29. In apparatus of the class described, the combination with an apparatus mounted for movement and comprising gyroscopic stabilizing means, of indicating means marking deviations of said apparatus from normal stabilized position and compensating means external to said apparatus and operatively connected therewith, said means being manually operable to compensate said apparatus in accordance with indicated deviations thereof.

In testimony whereof I have signed this specification.

JEAN FIEUX.